(12) United States Patent
Black et al.

(10) Patent No.: US 10,331,431 B2
(45) Date of Patent: Jun. 25, 2019

(54) MULTIPLE LASER MODULE PROGRAMMING OVER INTERNAL COMMUNICATIONS BUS OF FIBER LASER

(71) Applicant: nLIGHT, Inc., Vancouver, WA (US)

(72) Inventors: Nathaniel Black, Vancouver, WA (US); Timothy N. Kutscha, Portland, OR (US)

(73) Assignee: nLIGHT, Inc., Vancouver, WA (US)

( * ) Notice: Subject to any disclaimer, the term of this patent is extended or adjusted under 35 U.S.C. 154(b) by 104 days.

(21) Appl. No.: 15/347,569

(22) Filed: Nov. 9, 2016

(65) Prior Publication Data

US 2017/0139700 A1    May 18, 2017

Related U.S. Application Data

(60) Provisional application No. 62/256,571, filed on Nov. 17, 2015.

(51) Int. Cl.
*G06F 9/445* (2018.01)
*G06F 13/38* (2006.01)
*G06F 13/42* (2006.01)
*G06F 13/40* (2006.01)
*G06F 8/65* (2018.01)

(52) U.S. Cl.
CPC .............. *G06F 8/65* (2013.01); *G06F 13/385* (2013.01); *G06F 13/4022* (2013.01); *G06F 13/426* (2013.01); *G06F 13/4286* (2013.01)

(58) Field of Classification Search
CPC ...... G06F 8/65; G06F 13/385; G06F 13/4022; G06F 13/426; G06F 13/4286
USPC ........................................................ 717/168
See application file for complete search history.

(56) References Cited

U.S. PATENT DOCUMENTS

| | | | |
|---|---|---|---|
| 7,505,331 B1 | 3/2009 | Camarota | |
| 2002/0140966 A1* | 10/2002 | Meade, II | G06F 8/65 358/1.15 |
| 2003/0020512 A1* | 1/2003 | Mantey | G06F 15/7867 326/38 |
| 2010/0106356 A1* | 4/2010 | Trepagnier | G01S 17/023 701/25 |
| 2012/0216183 A1* | 8/2012 | Mahajan | G06F 8/65 717/170 |

* cited by examiner

*Primary Examiner* — John Q Chavis
(74) *Attorney, Agent, or Firm* — Klarquist Sparkman, LLP

(57) ABSTRACT

An apparatus includes a plurality of laser system modules coupled to a communication bus that includes a module update bus, each laser system module including at least one module update port coupled to the module update bus and at least one micro controller unit (MCU) in communication with the module update port, wherein each laser system module is situated to receive a module update instruction over the module update bus based on a type identifier in a general purpose input/output (GPIO) register of the at least one MCU of the corresponding laser system module that indicates a laser system module type.

22 Claims, 5 Drawing Sheets

MULTIPLE LASER MODULE PROGRAMMING OVER INTERNAL COMMUNICATIONS BUS OF FIBER LASER

CROSS REFERENCE TO RELATED APPLICATION

This application claims the benefit of U.S. Provisional Patent Application No. 62/256,571, filed Nov. 17, 2015, which is incorporated by reference herein in its entirety.

FIELD

The disclosure pertains to modular laser system programming and operation.

BACKGROUND

Laser technology breakthroughs and advances have provided an increasing variety of useful applications and industrial implementations of laser beams. Beams can be directed to one or more targets to cut, weld, anneal, ablate, heat, melt, or produce another type of laser processing based effect on or in the target, in a selective fashion. Different applications typically require beams with different characteristics, such as variations in output beam peak power, average power, response time, beam quality and beam parameter product, beam uniformity, beam precision, etc. However, despite the the variety of applications and corresponding variety laser system characteristics that support the applications, laser systems remain rigidly designed for specific applications and laser system components cannot be conveniently replaced, upgraded, or updated without replacing the entire laser system. Hence, further innovation to overcome these drawbacks is needed.

SUMMARY

According to one aspect of the disclosed technology, an apparatus includes a plurality of laser system modules coupled to a communication bus that includes a module update bus, each laser system module including at least one module update port coupled to the module update bus and at least one micro controller unit (MCU) in communication with the module update port, wherein each laser system module is situated to receive a module update instruction over the module update bus based on a type identifier in a general purpose input/output (GPIO) register of the at least one MCU of the corresponding laser system module that indicates a laser system module type.

According to another aspect of the disclosed technology, a method includes adjusting a bit arrangement of a GPIO register in at least one MCU in one or more laser system modules of a laser system so that the bit arrangement corresponds to a laser system module type, and arranging a communication bus that includes a module update bus between the one or more laser system modules so that a module update port of a master laser system module of the one or more laser system modules is situated to receive instruction from a computing device to scan the bit arrangements and update a firmware of the at least one MCU of each laser system module based on the scanned bit arrangements.

According to further aspect of the disclosed technology, a system includes a joint test action group (JTAG) adapter, at least one processor coupled to the JTAG adapter, and one or more computer-readable storage media including stored instructions that, responsive to execution by the at least one processor, cause the system to scan, through the JTAG adapter and a JTAG bus of a laser system that serially couples a plurality of laser system modules of the laser system, at least one laser system module, and determine a laser system module type based on a bit arrangement in a GPIO register of an MCU of the at least one laser system module.

The foregoing and other features and advantages of the disclosed technology will become more apparent from the following detailed description, which proceeds with reference to the accompanying figures.

DETAILED DESCRIPTION

Figure 1:
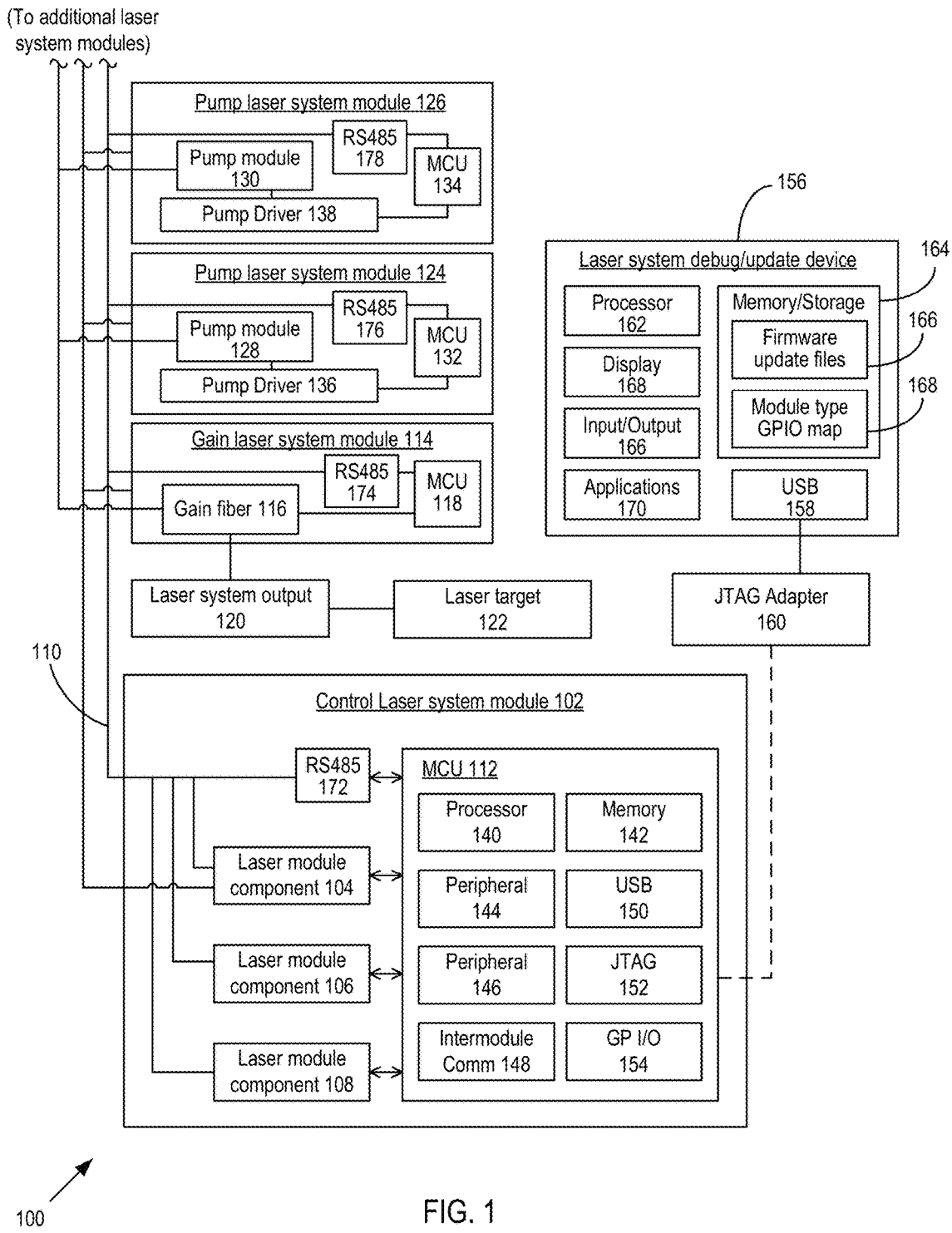
FIG. 1 is a schematic of a laser apparatus.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest," "best," "minimum," or the like. It will be appreciated that such descriptions are intended to indicate that a selection among many used functional alternatives can be made, and such selections need not be better, smaller, or otherwise preferable to other selections.

Herein, the term I/O means digital or analog input and/or output signals or ports. JTAG means joint test action group and typically refers to a physical interface and set of industry standards used for programming, testing and debugging of integrated circuits or printed circuit boards. The basic JTAG implementation is realized by the following four signals: Test Data In (TDI), Test Data Out (TDO), Test Mode Select (TMS), and Test Clock (TCK). RS485 refers specifically to the communications standard defined by Telecommunications Industry Association/Electronics Alliance (TIA/EA) and is formally known as TIA-485. RS 485 is a physical layer of a differential signaling standard for full or half duplex multidrop nodes. RS232 refers to TIA-232, which is a single ended physical layer standard maintained by TIA/EA. USB refers to the Universal Serial Bus standard. CAN means Controller Area Network and refers to the physical and other layers defined by ISO 11898-1, ISO 11898-3, and ISO 11898-3, or other specifications. MCU is an abbreviation of microcontroller unit, which can be of various forms and architectures, including various embedded systems, programmable logic controllers (PLCs), complex programmable logic devices (CPLDs), and field programmable gate arrays (FPGAs). MBPS refers to a megabits per second and is a common measure of data transmission rates. LVDS refers to low voltage differential signaling.

FIG. 1 illustrates a laser apparatus 100 that includes a plurality of laser system modules coupled to each other to perform different functions for the laser apparatus. In typical examples, the laser system modules are separate from each other and can be interchanged or upgraded with different modules or various features of the laser apparatus 100 can be expanded or subtracted by adding or removing different modules. The plurality of laser system modules typically includes a control laser system module 102 that includes control-oriented laser module components 104, 106, 108, a communication bus 110 that can also operate as an update bus, and microcontroller unit (MCU) 112 coupled to the laser module components 104, 106, 108 and the communication bus 110.

The plurality of laser system modules also includes a gain laser system module 114 that includes a gain fiber 116 and other laser module components, including a microcontroller unit (MCU) 118 that is coupled to the communication bus 110. With the gain fiber 116, the gain laser system module 114 produces a laser system output 120 that can be directed to one or more laser targets 122 associated with a laser process. Laser processes can include cutting, welding, annealing, marking, hole drilling, pattern formation, etc. The laser system output 120 can include one or more pulsed, continuous-wave, or quasi-continuous wave optical beams with various output powers, energies, durations, beam qualities (including single-mode), etc. While only one gain laser system module 114 is illustrated, it will be appreciated that multiple gain laser system modules can be used, including different or substantially identical modules, that are coupled together in the laser apparatus 100 so as to produce the laser system output 120.

The plurality of laser system modules further includes a pair of pump laser system modules 124, 126 each including one or more laser diode pump modules 128, 130, respectively, that generate pump light for delivery to the gain fiber 116 of the gain laser system module 114. The pump laser system modules 124, 126 also include respective MCUs 132, 134 that are also coupled to the communication bus 110. One or more pump drivers 136, 138 are coupled to the respective MCUs 132, 134 and laser diode pump modules 128 so as to drive the laser diodes with a controlled electrical source, such as a voltage or current. The generated pump light provides an energy source for the laser system output 120 produced by the gain fiber 116, and an output power modulation of the laser light generated laser diode pump modules 128, 130 is associated with an output power modulation of the laser system output 120. In some examples, the quantity, output, and/or types of laser diode pump modules 128, 130, and the corresponding pump laser system modules 124, 126 can be identical or substantially identical. The output power of the laser system output 120 can be scaled by adding similar or different laser diode pump modules to the laser apparatus 100 and failures or upgrades associated with various laser system modules can be addressed by swapping out the corresponding laser system module with one or more replacement laser system modules.

In some examples, upgrades to one or more of the existing laser system modules, such as an MCU, may be performed without replacing the laser system module. For example, the MCU 112 typically includes a processor 140 representative of various types, such as an embedded system central processing unit (CPU), situated to perform various data processing functions for the MCU 112. The MCU 112 also includes volatile and/or non-volatile memory 142 coupled to the processor 140 so as to provide high speed and low speed storage for the MCU 112, including firmware storage. A plurality of representative peripherals 144, 146 are coupled to the processor 140 and memory 142 so as to provide various controller functions of the MCU, such as timers, control algorithms, phase-locked loops, clock signals, oscillators, digital to analog converters (DACs), analog to digital converters (ADCs), etc. The MCU 112 further includes other various peripherals and input/output (I/O), including an intermodule communication port 148, a universal serial bus (USB) port 150, a joint test action group (JTAG) port 152, and a general purpose input output (GPIO) 154.

Updating the firmware of a modern embedded system, such as the firmware in the MCUs 112, 118, 132, 134, typically requires opening up the laser apparatus 100 and corresponding respective control, gain, or pump laser system modules 102, 114, 124, 126, and executing one or more programming scripts. In large industrial systems that typically use the laser apparatus 100, this can take an hour or more. Several different I/O ports can be used for programming a system, but as different laser system modules are added, coordinating and verifying the programmed firmware becomes increasingly difficult. Furthermore, providing additional internal communication busses increases the cost and complexity of the overall system. Serial-type implementations are typically slow, requiring access inside the different laser system modules. Board level JTAG approaches are also slow as they require access inside the MCUs of the various different laser system modules, and typical single-ended JTAG implementations are susceptible to noise. Some other ports and protocols, such as USB, Ethernet, and Controller Area Network (CAN), typically require too much firmware complexity to be feasible, and other protocols, such as USB, Serial, CAN are only capable of programming a single laser system module MCU at a time.

Some embodiments of the disclosed technology can be used to address any one or more of these issues and, in some examples, provide a reliable method of programming multiple (e.g., all) the programmable devices within multiple (e.g., all) laser system modules of the laser apparatus 100 from a single external connection. Some embodiments of the disclosed technology take a relatively short amount of time to complete (thus reducing build and service time), make deployment of new firmware and initial programming of laser systems and laser system modules more efficient, and/or reduce errors associated with coordinating multiple images and multiple update operations.

As further shown in FIG. 1, a laser system update device 156 is coupled to the MCU 112 of the control laser system module 102, including to the JTAG bus 152. The laser system update device 156 is coupled through a USB port 158 and a JTAG adapter 160 situated to convert the USB communication to JTAG communication. In some examples, an Ethernet port, RS-232, parallel port, or other communication port is used in place of the USB port 158 to couple to the JTAG adapter 160. The laser system update device 156 can be any of a variety of types of computing devices, including a desktop or laptop computer, mobile device or tablet computer, etc. The laser system update device 156 typically further includes a processor 162 to perform various computer operations, including one or more debugging or updating operations for the laser apparatus 100 or laser system modules. The processor 162 is coupled to a memory 164, I/O registers or ports 166, and the laser system update device 156 typically includes a display 168 through which one or more applications 170 can be viewed and interfaced by a user. The applications 170 can include laser system module debugging and MCU or other controller logic updating or laser system analysis programs.

In representative examples of the laser apparatus 100, the communication bus 110 includes lines situated to propagate the four standard JTAG signals, test clock (TCK), test data-out (TDO), test data-in (TDI), and test mode select (TMS). The communication bus 110 is wired, through RS485 transceivers 172, 174, 176, 178, to the respective MCUs 112, 118, 132, 134, including to the corresponding JTAG ports, such as the JTAG bus 152. By using RS485 to couple the communication bus 110 to the various laser system modules, including with the JTAG signals, improved noise immunity and common mode rejection can be obtained, allowing updating and debugging of active systems in noisy environments, such as factory environments or noise generated by the laser apparatus 100. In typical examples, JTAG pins of a laser system module MCU, such as MCU 112, are coupled to a corresponding RS485 transceiver, such as RS485 transceiver 172, and the communication bus 110 at a high data transfer speed, such as 20 MBPS. While RS485 uses differential signaling and can be used to extend the range and noise immunity of high speed digital signals, JTAG is not typically used or associated with communication between multiple modules over RS485. The JTAG communication protocol provides a fast interface for field programming or reprogramming of the laser apparatus 100, and can be superior to single-ended JTAG protocol used for internal firmware development and factory use. Also, single-point programming typically requires significant electrical system architecture changes to be realized, including using LVDS lines inside the system for programming of several programmable devices. By using features of the JTAG systems and methods herein, faster and easier reflash times are provided, improving serviceability, manufacturability, and overall organizational flexibility in various laser systems and apparatus.

In some examples, the communication bus 110 further includes a mode select line that is used to disable the JTAG bus portion of the communication bus 110 during active normal operation so as to prevent spurious reset or lock-up of one or more of the MCUs 112, 118, 132, 134, and adding robustness and security to the existing JTAG protocol of the laser system modules. The mode select line can be asserted through the laser system update device 156 or with another device so as to enable high speed reprogramming of one or more of the laser system modules of the laser apparatus 100. In some examples, the mode select line can be selected with a switch on the laser apparatus 100. In further examples, the mode select line can be asserted through software over an existing line of the communication bus 110 so as to reduce the number of lines of the communication bus 110. The mode select line can also be configured such that proprietary hardware, such as the laser system update device 156, is required to switch the mode select bus mode and perform a firmware update, thereby preventing accidental updates from unauthorized users. For example, the laser system update device 156 can be coupled to the laser apparatus 100, and from there to the MCU 112, with a proprietary cable that carries the JTAG signals and the mode select line. The representative examples using the JTAG signals and mode select line do not require boot-loader software as JTAG can be the native way to program the MCUs. Thus, there is a relatively low chance that the laser apparatus 100 could be rendered non-updateable due to user errors, power losses, or unforeseen events.

To update the firmware files of one or more of the MCUs 112, 118, 132, 134 in the corresponding control, gain, and pump laser system modules 102, 114, 124, 126, the laser system update device 156 includes firmware update files 166 in the memory 164 that can be transferred from the laser system update device 156 to the MCU 112 and subsequently to the JTAG ports of the MCUs 118, 132, 134 over the JTAG portion of the communication bus 110. Because one or more of the plurality of laser system modules are different from each other, the memory 164 further includes a laser system module type GPIO map 168. The laser system update device 156 selects and sends one of the firmware update files 166 to an MCU of a laser system module of the laser apparatus 100 based on a GPIO register configuration detected in the corresponding laser system module MCU. For example, for the control laser system module 102, the GPIO 154 includes a GPIO register bit configuration that identifies the MCU 112 as a control laser system module type MCU. The laser system update device 156 selects from the firmware update files 166 stored in the memory 164, and based on the mapping of firmware updates and laser system module types in the laser module type GPIO map 168, a firmware update that corresponds to the bit configuration in the register of the GPIO 154. The firmware files for the MCUs 118, 132, 134 and other laser system modules MCUs of the laser apparatus 100 can be sequentially updated over the communication bus 110 with the same laser system update device 156 coupled to the control laser system module 102, based on the laser system module type identified in the respective GPIO register of the MCUs 118, 132, 134. The update process can be automated so that the firmware files of all of the various laser system modules of the laser apparatus 100 can be rapidly updated from a single session with the laser system update device 156 (e.g., in less than five minutes).

The JTAG protocol allows for multiple JTAG compliant devices to be arranged in a series, from TDO to TDI, typically originating from a master module and with signals extending to one or more slave modules. In the example shown in FIG. 1, the control laser system module 102 is designated as a master module and the gain and pump laser system modules 114, 124, 126 are slave modules. The JTAG port 152 of the MCU 112 of the control laser system module 102 is coupled to the external laser system update device 156 for initial programming and so as to receive firmware updates for the MCU 112, and the MCUs of the remaining laser system modules. The MCU 112 is coupled to the communication bus 110 through the intermodule communication port 148. The intermodule communication port 148 includes various communication lines along with JTAG lines TCK, TDO, TDI, and TMS. Each slave module receives the TDI signal from a preceding slave module (or from the preceding master module for the first slave module in series) and sends a TDO signal out to a subsequent slave module. The TDO pin of the final slave module is connected to the TDO pin of the communication bus, providing TDO feedback to the master module. Each of the slave modules includes a bus mode select bit coupled to the communication bus 110 and internal logic that enables the JTAG TDO from the corresponding slave module when the bus mode bit is asserted in that module. In some examples, the bus mode bit is selected over the mode select line of the communication bus 110.

Figure 2:
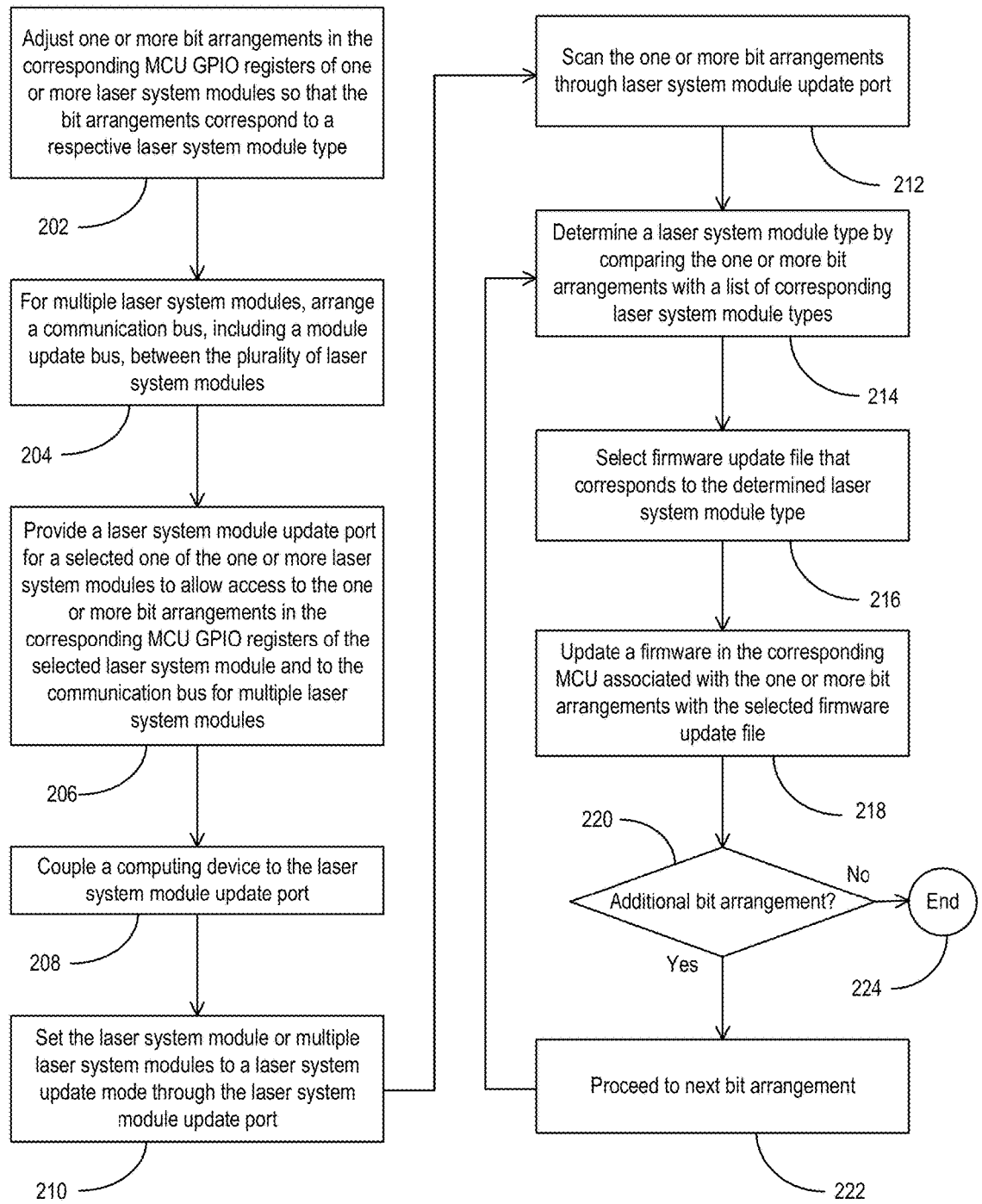
FIG. 2 is a flowchart of a laser module update method.

FIG. 2 shows a method 200 of updating a multi-module or single module laser system. At 202, one or more bit arrangements in the GPIO registers of respective laser system module MCUs of a multi-module laser system are adjusted to correspond to a laser system module type of the respective laser system module. For example, a control laser system module may have a portion of the MCU GPIO register provided with a bit arrangement indicating the MCU is a control laser system module MCU. A bit arrangement in the MCU GPIO register of a pump or gain laser system module can indicate a corresponding pump or gain laser system module MCU. Single laser system modules or multiple modules of a multi-module laser system can be accessed, programmed, and/or updated based on the pre-programmed bit arrangements. In multiple laser system module examples, at 204, a communication bus that includes a module update bus, such as JTAG, is arranged between the multiple laser system modules.

At 206, a laser system module update port is provided for a selected one of multiple or laser system modules, which can be designated a master laser system module, so as to allow communication access to view the GPIO register bit arrangements in the MCU of the master laser system module and access through the communication bus to view the GPIO register bit arrangements in the MCUs of the slave laser system modules. In representative examples, the laser system module update port typically includes JTAG communication lines. At 208, a computing device, such as a laptop or mobile computer with a JTAG signal transceiver, is coupled to the laser system module update port. At 210, one or more of the laser system modules are set to a module update mode through the laser system module update port. In further examples, the update mode is selected through an alternative communication path or locally on the multi-module or single module laser system. At 212, the GPIO register bit arrangements of one or more of the laser system modules of the laser system are scanned through the laser system module update port, and, at 214, the corresponding laser system module type of the laser system modules is determined by comparing the scanned bit arrangements with a list of laser system module types that correspond to different bit arrangements. At 216, a firmware update file is selected that corresponds to the laser system module type of a laser system module determined at 214, and, at 218, the firmware in the MCU of the corresponding laser system module is updated based on the bit arrangement and list of laser system module types. At 220, a check is performed as to whether additional bit arrangements or laser system modules are present for updating, and if additional ones are present, at 222, the method 200 proceeds to update the firmware of the next laser system module based on a laser system module type determined at 214 for the next laser system module.

Figure 3:
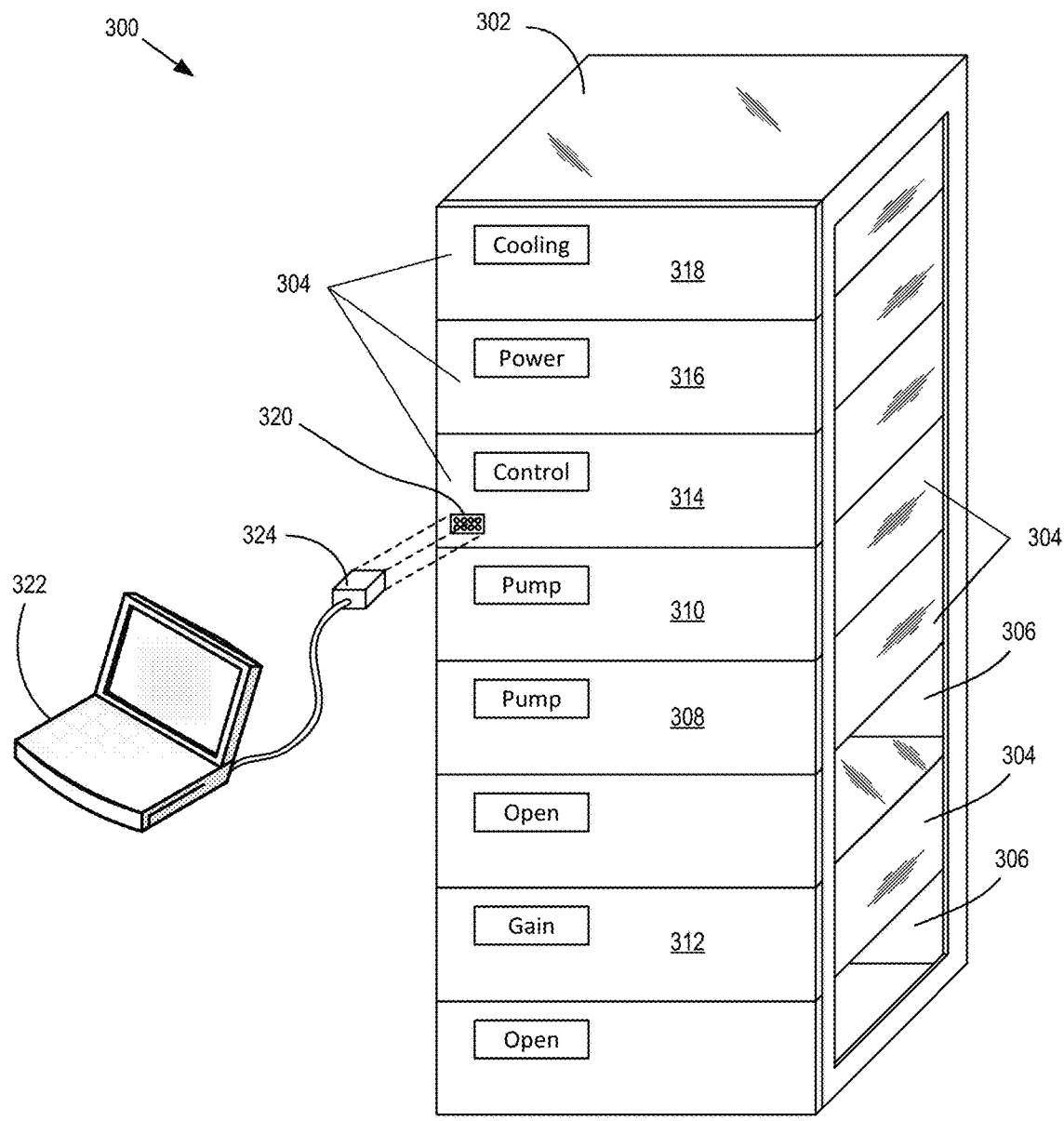
FIG. 3 is a perspective view of a laser apparatus.

FIG. 3 shows an example of a modular laser system 300 mounted in a housing 302, such as a standard 19" vertical industrial rack. The modular laser system 300 includes a plurality of laser system modules 304 that are horizontally situated and vertically stacked in the housing 302. In some examples, the housing 302 has a rack width different from 19", and in other examples the laser system modules 304 are situated vertically or at another angle. One or more empty portions 306 of the housing 302 can be situated to receive additional or larger laser system modules 304 so as to allow the modular system 300 to receive field upgrades, downgrades, or reconfigurations depending on the industrial laser process or application, and also to allow a flexible platform for different types of laser systems. The laser system modules 304 can include a pair of pump modules 308, 310, a gain module 312, a control module 314, a power module 316, and a cooling module 318. It will be appreciated that various laser system modules 304 can be omitted or have respective functions combined with other laser system modules 304. The gain module 312 is situated to produce a laser system output beam, e.g., with a fiber laser oscillator or fiber laser amplifier, and the pump modules 308, 310 are optically coupled to the gain module 312 so as to provide the gain module 312 with a source of optical pump energy. The power module 316 is situated to receive an electrical line voltage and provide power to one or more of the other laser system modules 304. The cooling module 318 is situated to maintain or adjust a temperature of one or more of the laser system modules 304, such as the pump modules 308, 310 and gain module 312, which can generate substantial amounts of heat.

The control module 314 is situated to execute control operations for one or more of the laser system modules 304. In typical examples, each of the laser system modules 304, including the control module 314, includes at least one MCU that can provide various control, monitoring, and synchronization functions with various components of the particular laser system module 304 and with other laser system modules 304. The MCUs of laser system modules 304 are coupled over a communication bus to allow various communications and to effect various interactions between the laser system modules 304. For example, an output from the cooling module 318 can depend on a temperature detected in the pump module 310. The communication bus can include an update bus portion, such as a JTAG bus, that allows for JTAG communication between the plurality of MCUs. The control module 314 can be designated as a master module with the remaining laser system modules 304 designated as slave modules, and the JTAG bus can be arranged in series between the plurality of laser system modules 304, beginning with the control module 310.

In representative examples, the JTAG bus is coupled directly into the JTAG port of the MCU of the slave module, and is coupled to an intermodule communication port of the master control module 314. The JTAG port of the MCU of the control module 314 is exposed at an update plug interface 320 on the exterior of the control module 314. An external computing device 322, such as a portable laptop computer or mobile handheld computing device, can include a standard or proprietary connector 324 that can couple to the update plug interface 320 so that a communication path is provided to update or debug the plurality of laser system modules 304. In typical examples, each of the MCUs has a bit arrangement preconfigured in the GPIO register of the MCU that corresponds to the MCU type or laser system module type. The external computing device 322 includes laser system module type specific firmware updates and a list mapping the GPIO bit arrangements to the corresponding laser system module type and firmware update.

Each MCU's firmware can be updated over the JTAG bus through the single update plug interface 320 quickly, without requiring direct access to each module, by using the GPIO register module identification and the update bus portion of the communication bus. The external computing device 322 can include one or more processors and tangible, non-transitory computer-readable media (e.g., one or more optical media discs, volatile memory devices (such as DRAM or SRAM), or nonvolatile memory or storage devices (such as hard drives, NVRAM, and solid state drives (e.g., Flash drives)). The one or more processors can execute computer-executable instructions stored on one or more of the tangible, non-transitory computer-readable media, and thereby perform update operations for the MCU of the control module 314 and the other MCUs coupled to the communication bus.

In some embodiments, two or more laser system modules 304 can be substantially identical, such as the pump modules 308, 310. The series relationship of the update bus portion of the communication bus between the laser system modules 304 can define a module order so that identical modules can be assigned a position and identified as being a laser system module in the assigned position during operation. Furthermore, otherwise identical laser system modules can be sent module position dependent firmware files based on the assigned position or module order. In some examples, a bus mode selection toggle command can be sent from the external computing device 322, or selected elsewhere on the control module 314 or modular laser system 300, so as to enable the update bus portion during the firmware updating process and disable the update bur portion after completion so that noise or other inadvertent signals over the update bus portion are prevented during normal operation of the modular laser system 300.

Figure 4:
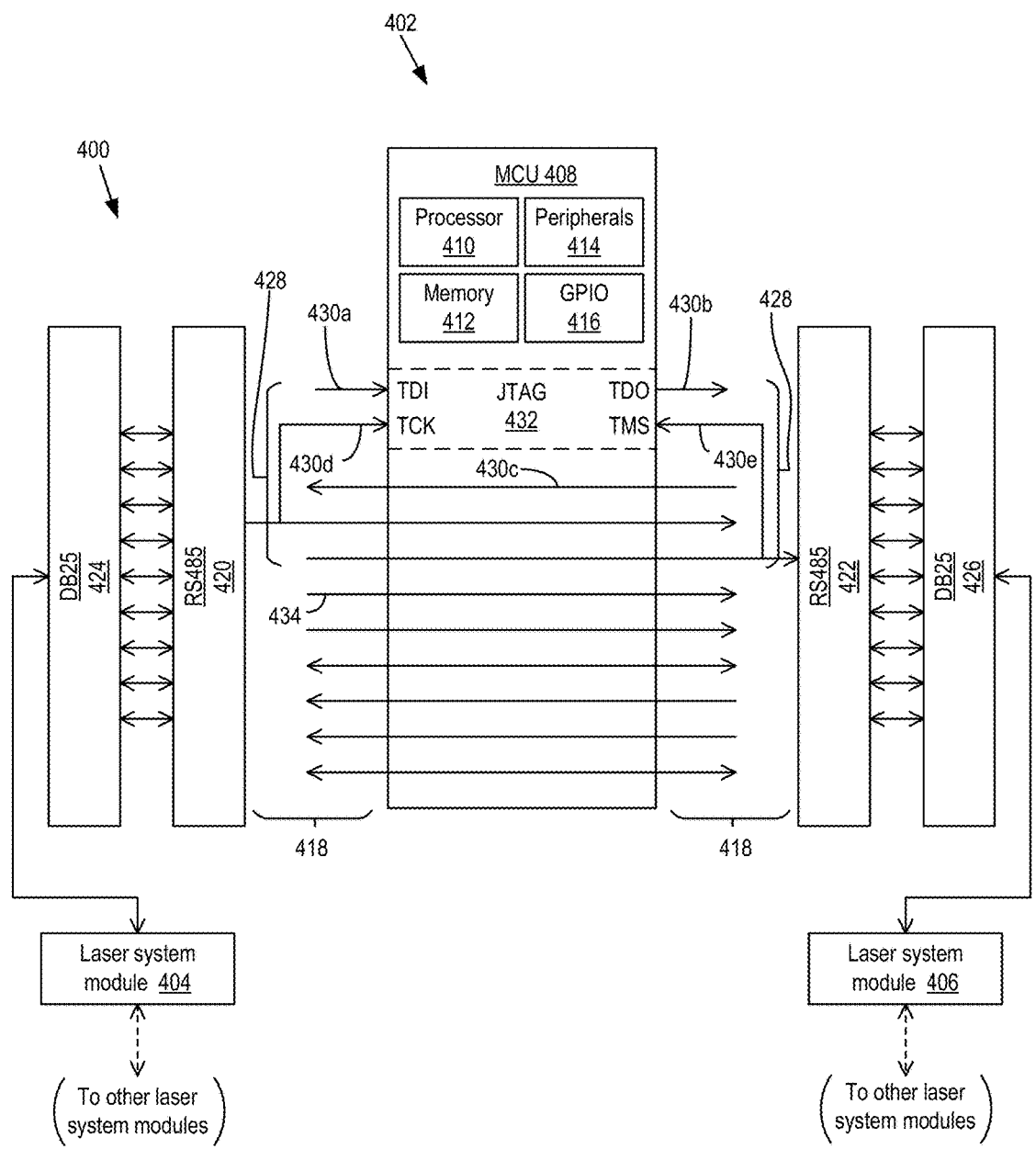
FIG. 4 is a schematic of a laser system module and communication bus.

FIG. 4 shows a communication bus 400 providing a communication path between a representative laser system module 402 and a plurality of other laser system modules 404, 406 of a modular laser system. The laser system module 402 includes at least one MCU 408 that includes a processor 410, memory 412 coupled to the processor 410, and various peripherals 414 and GPIO 416 coupled to the processor 410 and memory 412 and associated with various tasks and functions of the laser system module 402, including but not limited to parameters associated with laser waveform generation, control, and monitoring. Parameters can include power, modulation, temperature, voltage, current, etc. In typical modular laser systems, one or more of the other laser system modules 404, 406 can be the same or different from the laser system module 402. For example, the laser system module 402 can be situated to generate an output beam with one or more gain fibers (e.g., a gain module) or situated to generate and combine optical pump energy for delivery through an optical fiber to a separate gain laser system module that generates an output beam. In further embodiments, the laser system module 402 can be situated to control, switch power, or regulate thermal attributes of the other laser system modules 404, 406.

The communication bus 400 includes various intermodule communication lines 418 situated to carry various communication signals between the laser system module 402 and other laser system modules 404, 406. The intermodule communication lines 418 of the communication bus 400 are typically coupled to an RS485 transceivers 420, 422 to convert the various communication signals for reliable transmission between the laser system modules 402, 404, 406. The converted signals are coupled between the laser system modules 402, 404, 406, in series and/or parallel, with DB25 ribbon cables 424, 426, by way of example. It will be appreciated that a variety of cables and connectors can be used to connect the communication bus 400 between the various laser system modules.

One or more update bus lines 428 are included in the intermodule communication lines 418. In representative embodiments, the update bus lines 428 include JTAG bus lines 430a-430e that carry four JTAG signals, TDI, TDO, TCK, and TMS. The TCK and TMS signals are propagated in parallel among the laser system modules 402, 404, 406 over JTAG bus lines 430d and 430e, respectively, and are coupled to TCK and TMS pins of a JTAG port 432 of the MCU 408. The TDI signal for the laser system module 402 is received over the JTAG bus line 430a as the TDO signal from the laser system module 404, and the TDO signal from the laser system module 402 is sent over the JTAG bus lines 430b to be received at the TDI input of the laser system module 406, thereby serially arranging and coupling the TDI and TDO signals between the laser system modules 402, 404, 406. The TDO signal from a final module, e.g., the laser system module 406, is coupled to an initial module of the serial arrangement, e.g., the laser system module 404, over the JTAG bus line 430c so as to provide the return TDO signal to the initial module. In typical examples, the initial module is designated as a master laser system module and each other laser system module is designated as a slave laser system module. Through the JTAG port 432, the JTAG bus lines 430a-430e of the update bus lines 428 have direct access to various components of the MCU 408, including registers of the processor 410, memory 412, peripherals 414, and GPIO 416, including during active operation of the laser system module 402 and laser system in which the laser system module 402 is situated.

The intermodule communication lines can 418 can include one or more mode select lines 434 that can be used to selectively enable or disable the update bus lines 428 during normal operation so as to prevent potential signal conflicts in the MCU 408 with noise or undesired signals transmitted over the update bus lines 428 that could damage or lock-up the MCU 408. After enabling the update bus lines 428 through assertion of the mode select line 434, a firmware update can be sent to the MCU 408 using the JTAG protocol. In representative examples, the laser system module type of the laser system module 402 is identifiable over the update bus lines 428 by a bit arrangement predefined in the register of the GPIO 416 or other I/O of the MCU 408. With the serial arrangement defined of the update bus lines 428, the appropriate firmware update for the corresponding laser system module type can be sent to each of the laser system modules 402, 404, 406 in rapid succession to simplify updating of the laser system, allowing easier reflash times, thereby improving serviceability, manufacturability, and overall organizational flexibility of the laser system.

Figure 5:
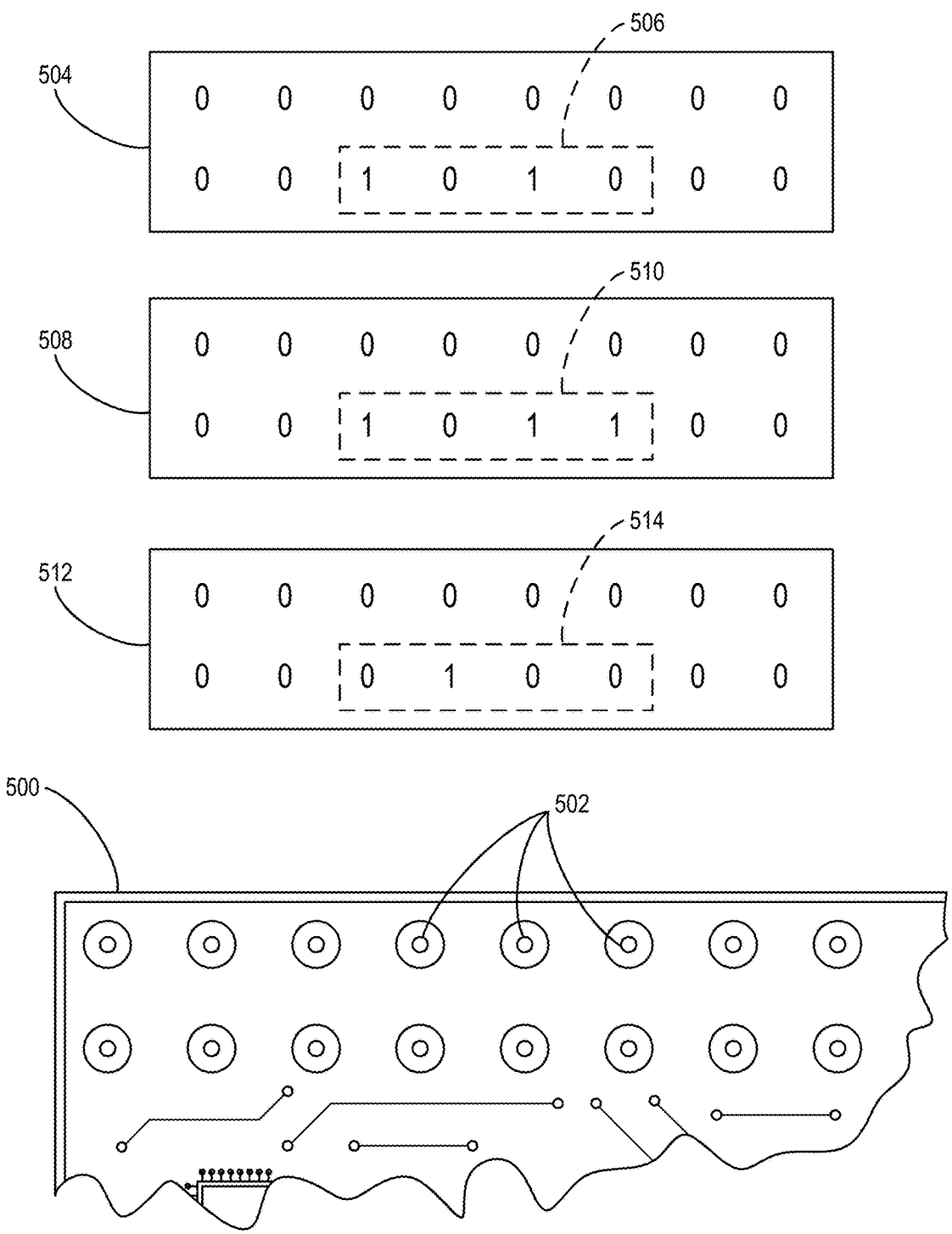
FIG. 5 is a top view of a portion of a microcontroller unit and corresponding bit registers.

FIG. 5 shows a portion of an MCU 500 situated in a laser system module of a modular laser system. The MCU 500 includes a set of GPIO pins 502 that can be used for various input/output purposes in the laser system module or between laser system modules. The GPIO pins 502 can be enabled, disabled, readable, and writable, typically to binary high or low values, during normal operation of the MCU 500. The binary values are stored in a GPIO hardware register and are accessible by a CPU of the MCU 500. The binary values in the register are also typically directly accessible through one or more MCU debugging protocols, such as JTAG. Different types of laser system modules can be assigned a laser system module type identifier with one or more of the GPIO pins and the corresponding bit arrangement in the GPIO hardware register. For example, during programming of a first laser system module MCU GPIO register 504, a bit arrangement 506 defined by four GPIO pins at 1 0 1 0 can designate a first laser system module type. In a second laser system module MCU GPIO register 508, a bit arrangement 510 at 1 0 1 1 can designate a second laser system module type, and in a third laser system module MCU GPIO register 512, a bit arrangement 514 at 0 1 0 0 can designate a third laser system module type. During a JTAG scan of a plurality of laser system modules coupled over a JTAG bus, the different types of laser system modules can be identified based on the bit arrangements in the MCU GPIO registers and firmware files can be quickly sent to update each of the different MCUs based on the different laser system module types that are detected. In typical examples, laser system module bit arrangements for identical modules can be the same, though in some examples the identical modules have different bit arrangements.

Having described and illustrated the principles of the disclosed technology with reference to the illustrated embodiments, it will be recognized that the illustrated embodiments can be modified in arrangement and detail without departing from such principles. For instance, elements of the illustrated embodiments shown in software may be implemented in hardware and vice-versa. Also, the technologies from any example can be combined with the technologies described in any one or more of the other examples. It will be appreciated that procedures and functions such as those described with reference to the illustrated examples can be implemented in a single hardware or software module, or separate modules can be provided. The particular arrangements above are provided for convenient illustration, and other arrangements can be used.

In view of the many possible embodiments to which the principles of the disclosed technology may be applied, it should be recognized that the illustrated embodiments are only representative examples and should not be taken as limiting the scope of the disclosure. Alternatives specifically addressed in these sections are merely exemplary and do not constitute all possible alternatives to the embodiments described herein. For instance, various components of systems described herein may be combined in function and use. We therefore claim all that comes within the scope and spirit of the appended claims.

We claim:

1. An apparatus, comprising:
    a plurality of laser system modules coupled to a communication bus that includes a module update bus, each laser system module including at least one module update port coupled to the module update bus and at least one micro controller unit (MCU) in communication with the module update port;
    wherein each laser system module is situated to receive a module update instruction over the module update bus that updates the laser system module based on a type identifier in a general purpose input/output (GPIO) register of the at least one MCU of the corresponding laser system module that indicates a laser system module type.

2. The apparatus of claim 1, wherein the plurality of laser system modules are situatable to switch between an active normal state in which the plurality of laser system modules are situated to produce an output laser beam and an active module update state that enables the module update bus.

3. The apparatus of claim 2, wherein the communication bus includes a bus mode select line coupled to each laser system module that is operable to switch between the active normal state and the active module update state.

4. The apparatus of claim 3, wherein the switch between the active normal state and the active module update state is assertable over the communication bus via software instruction.

5. The apparatus of claim 1, wherein the module update bus includes a JTAG bus that includes a clock line and a test mode select line, each coupled in parallel to the plurality of laser system modules, and wherein the JTAG bus further includes a test data line coupled serially between the plurality of laser system modules such that a test data output (TDO) position on a selected laser system module is coupled to a test data input (TDI) position on a separate laser system module.

6. The apparatus of claim 1, wherein the plurality of laser system modules includes one or more slave laser system modules and a master laser system module, wherein the master laser system module is couplable to an external computing device through the module update port of the master laser system module.

7. The apparatus of claim 1, further comprising an external computing device coupled to the module update port of the master laser system module and situated to scan, through the module update bus, the type identifiers of each laser system module and update a firmware of the at least one MCU associated with the type identifier of the corresponding laser system module.

8. The apparatus of claim 7, wherein the external computing device is situated to determine a laser system module quantity and a duplicate module order based on the scanned type identifiers and the sequence of the serially coupled laser system modules.

9. The apparatus of claim 8, wherein the plurality of laser system modules includes a control module, a laser gain module, and a plurality of laser pump modules.

10. The apparatus of claim 9, further including an industrial rack situated to receive and adjacently arrange the plurality of laser system modules.

11. The apparatus of claim 1, wherein the communication bus is coupled to the plurality of laser system modules with one or more RS485 transceivers.

12. A method, comprising:
    adjusting a bit arrangement of a general purpose input output (GPIO) register in at least one microcontroller unit (MCU) in one or more laser system modules of a laser system so that the bit arrangement corresponds to a laser system module type; and
    arranging a communication bus that includes a module update bus between the one or more laser system modules so that a module update port of a master laser system module of the one or more laser system modules is situated to receive instruction from a computing device to scan the bit arrangements and update a firmware of the at least one MCU of each laser system module based on the scanned bit arrangements.

13. The method of claim 12, further comprising:
    coupling the computing device to the module update port of the master laser system module;
    selecting a bus mode in each of the laser system modules that corresponds to a module update protocol;

scanning the plurality of laser system modules over the module update bus, including the bit arrangements of the GPIO registers; and determining the laser system module type of at least one laser system module based on the scanned bit arrangement of the at least one laser system module.

14. The method of claim 13, further comprising:

comparing the bit arrangement in the GPIO register of the at least one MCU of the at least one laser system module to a bit arrangement list file on the computing device so as to identify a corresponding laser system module firmware file; and sending the identified firmware file from the computing device to the at least one MCU of the at least one laser system module through the module update port and module update bus so as to update the firmware of the at least one MCU of the at least one laser system module.

15. The method of claim 13, further comprising determining a laser system module quantity based on the number of scanned bit arrangements.

16. The method of claim 13, further comprising determining a laser system module sequence based on a serial order of the plurality of laser system modules on the module update bus.

17. The method of claim 14, further comprising:

comparing the bit arrangements of the remaining one or more laser system modules so as to identify the corresponding laser system module firmware files; and sending the identified firmware files from the computing device through the module update port and module update bus so as to update the firmware of the remaining one or more laser system modules.

18. The method of claim 12, wherein the module update bus is a joint test action group (JTAG) bus and the module update port is a JTAG port.

19. A system, comprising:

a joint test action group (JTAG) adapter;

at least one processor coupled to the JTAG adapter; and one or more computer-readable storage media including stored instructions that, responsive to execution by the at least one processor, cause the system to:

scan, through the JTAG adapter and a JTAG bus of a laser system that serially couples a plurality of laser system modules of the laser system, at least one laser system module, and determine a laser system module type based on a bit arrangement in a general purpose input output (GPIO) register of a microcontroller unit (MCU) of the at least one laser system module.

20. The system of claim 19, wherein the stored instructions further cause the system to update a firmware of the MCU of the at least one laser system module based on the determined laser system module type.

21. The system of claim 19, wherein the stored instructions further cause the system to select a bus mode for the laser system modules that corresponds to a JTAG access protocol and a disabling of laser beam output.

22. The system of claim 19, wherein the stored instructions further cause the system to determine a laser system module quantity based on the number of bit arrangements detected through the JTAG scan of the plurality of laser system modules, and to determine a laser system module sequence based on a serial order of the plurality of laser system modules coupled to the JTAG bus.

* * * * *